United States Patent
Guethoff et al.

(10) Patent No.: US 11,869,278 B2
(45) Date of Patent: Jan. 9, 2024

(54) METHOD FOR DETERMINING A STATUS OF ONE OF MULTIPLE MACHINE COMPONENTS OF A MACHINE AND STATUS-DETERMINING SYSTEM

(71) Applicant: Lenze Automation GmbH, Aerzen (DE)

(72) Inventors: Ralf Guethoff, Paderborn (DE); Nico Scholze, Hameln (DE)

(73) Assignee: Lenze Automation GmbH, Aerzen (DE)

( * ) Notice: Subject to any disclaimer, the term of this patent is extended or adjusted under 35 U.S.C. 154(b) by 0 days.

(21) Appl. No.: 16/766,931

(22) PCT Filed: Nov. 26, 2018

(86) PCT No.: PCT/EP2018/082561
§ 371 (c)(1),
(2) Date: May 26, 2020

(87) PCT Pub. No.: WO2019/101999
PCT Pub. Date: May 31, 2019

(65) Prior Publication Data
US 2021/0027549 A1    Jan. 28, 2021

(30) Foreign Application Priority Data
Nov. 27, 2017    (DE) .................. 10 2017 221 227.6

(51) Int. Cl.
*G05B 19/4065* (2006.01)
*G07C 3/08* (2006.01)

(52) U.S. Cl.
CPC ........... *G07C 3/08* (2013.01); *G05B 19/4065* (2013.01); *G05B 2219/37214* (2013.01)

(58) Field of Classification Search
CPC .............. G07C 3/08; G05B 19/4065; G05B 2219/37214; Y02P 90/80; G06Q 10/0631; G06Q 10/20
(Continued)

(56) References Cited

U.S. PATENT DOCUMENTS 10,061,874 B2    8/2018    Dallmann et al.
10,410,290 B2    9/2019    MacNeille et al.
(Continued)

FOREIGN PATENT DOCUMENTS

DE    10 2010 043 651 A1    3/2012
DE    10 2017 105 631 A1    9/2017
(Continued)

OTHER PUBLICATIONS

International Search Report (PCT/ISA/210) issued in PCT Application No. PCT/EP2018/082561 dated Feb. 26, 2019 with English translation (seven pages).
(Continued)

*Primary Examiner* — Kenneth M Lo
*Assistant Examiner* — Mohammed Shafayet
(74) *Attorney, Agent, or Firm* — Crowell & Moring LLP

(57) ABSTRACT

A method for determining a status of one of multiple machine components of a machine on the basis of a digital machine model, wherein the digital machine model describes the multiple machine components, includes the steps of: determining component manufacturer data of the multiple machine components; determining machine manufacturer data of the multiple machine components; determining machine operator data of the multiple machine components; and determining the status of the one of the multiple machine components by linking the determined
(Continued)

component manufacturer data, the determined machine manufacturer data and the determined machine operator data.

6 Claims, 1 Drawing Sheet

(58) Field of Classification Search
USPC .......................................................... 700/108
See application file for complete search history.

(56) References Cited

U.S. PATENT DOCUMENTS

| | | | |
|---|---|---|---|
| 2005/0143956 A1* | 6/2005 | Long | F04D 15/0088 702/184 |
| 2006/0142978 A1* | 6/2006 | Suenbuel | H04W 8/245 703/1 |
| 2012/0304007 A1* | 11/2012 | Hanks | G05B 23/0216 714/26 |
| 2013/0082846 A1 | 4/2013 | McKinley et al. | |
| 2014/0343911 A1* | 11/2014 | Dallmann | G05B 19/4188 703/6 |
| 2016/0274553 A1* | 9/2016 | Strohmenger | G05B 17/02 |
| 2017/0192414 A1* | 7/2017 | Mukkamala | H04L 63/0823 |
| 2018/0005132 A1* | 1/2018 | Singh | G06N 7/005 |
| 2018/0275630 A1* | 9/2018 | Kao | H04L 41/5041 |
| 2018/0284758 A1* | 10/2018 | Cella | G06N 3/006 |
| 2019/0023296 A1 | 1/2019 | Koehler et al. | |

FOREIGN PATENT DOCUMENTS

| | | |
|---|---|---|
| EP | 2 804 061 A1 | 11/2014 |
| EP | 3 193 311 A1 | 7/2017 |
| WO | WO 2004/013785 A2 | 2/2004 |

OTHER PUBLICATIONS

German-language Written Opinion (PCT/ISA/237) issued in PCT Application No. PCT/EP2018/082561 dated Feb. 26, 2019 (eight pages).

* cited by examiner

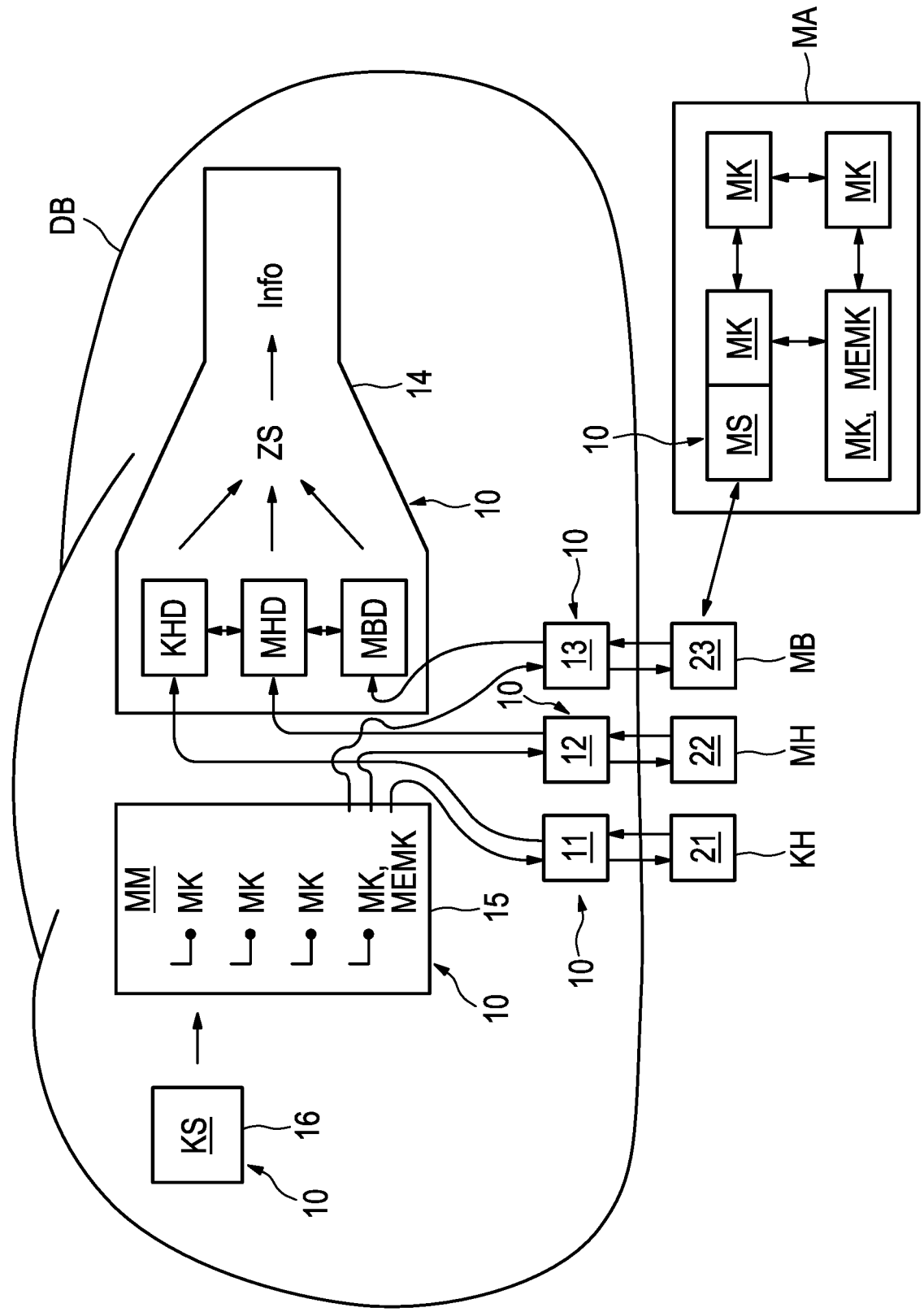

METHOD FOR DETERMINING A STATUS OF ONE OF MULTIPLE MACHINE COMPONENTS OF A MACHINE AND STATUS-DETERMINING SYSTEM

BACKGROUND AND SUMMARY OF THE INVENTION

The invention relates to a method for determining a status of one of multiple machine components of a machine and to a status-determining system.

A method for determining a status of one of multiple machine components of a machine and a status-determining system are known.

The invention is based on the problem of making it possible to make available a method for determining a status of one of multiple machine components of a machine and of a status-determining system which makes improved status determination respectively possible.

The invention solves this problem by providing a method and a status-determining system according to the claimed invention. Advantageous developments of the invention are described in the dependent claims.

The method according to the invention, in particular an automatic method, for determining a status, in particular of at least one of multiple machine components of a machine, in particular of all the machine components, on the basis of a digital machine model, wherein the digital machine model describes the multiple machine components, comprises the steps: determining, in particular automatically determining, in particular digital, component manufacturer data of the multiple machine components; determining, in particular automatically determining, in particular digital, machine manufacturer data of the multiple machine components; determining, in particular automatically determining, in particular digital, machine operator data of the multiple machine components; and determining, in particular automatically determining, the status of the one of the multiple machine components by, in particular logic, linking the determined component manufacturer data, the determined machine manufacturer data and the determined machine operator data.

The method makes possible improved status determination, in particular by linking the component manufacturer data, the machine manufacturer data and the machine operator data.

In particular, the digital machine model can be a digital modeling of the machine. The digital machine model can in the simplest case be a structured part list of the multiple, or all of the, machine components. For each machine component it is possible to provide an associated memory area in a database, in which data/information relating to the machine component can be stored or saved. For example the component manufacturer data, the machine manufacturer data and the machine operator data can be stored in the memory area of a machine component. The digital machine model is frequently also referred to as a digital twin of the machine. In particular, the digital machine model or the digital twin can permit, in particular important, assistance for the use of remote maintenance and the intelligent planning of maintenance intervals.

The machine manufacturer data can be determined simultaneously, or chronologically before or after the component manufacturer data. The machine operator data can be determined simultaneously or chronologically before or after the component manufacturer data and/or the machine manufacturer data.

The status can in the simplest case describe or model whether the associated machine component may or may not constitute a risk of, in particular long-term, failure of the machine, in particular whether the machine component may be in a satisfactory state or be fault-free or not or be faulty.

Additionally or alternatively, the digital machine model, in particular the structured part lists, the component manufacturer data, the machine manufacturer data, the machine operator data, the status and/or a location of the machine, can be output, in particular displayed, in particular visually, in particular by means of a screen. In particular, this can permit a visual model of the machine. Additionally or alternatively, the location can be marked or visualized on a map.

As a further addition or alternative, the data which are relevant for the status can be output. Additionally or alternatively, the component manufacturer data, the machine manufacturer data and/or the machine operator data can be searched through, in particular for the relevant data, in particular relating to one of multiple machine components and/or with respect to the status. In particular, a search can be carried out on the basis of key words, e.g. according to a fault code. This can permit a solution to be able to be found rapidly, in particular in the faulty status.

As a further addition or alternative, at least one machine component and/or the machine, in particular multiple, in particular all, of the machine components and/or the machine each have, in particular, an, in particular optically readable, designation, in particular a bar code. In particular, the at least one machine component can be registered by means of the designation, in particular by means of a camera, in particular a smartphone, and the component manufacturer data of the machine component can be determined on the basis thereof. Additionally or alternatively, the machine can be registered by means of the designation, in particular by means of a camera, in particular a smartphone, and the status can be determined on the basis thereof and/or output.

In one development of the invention, the digital machine model is generated, in particular automatically, from an, in particular digital, design system. This makes relatively simple generation of the machine model possible. In particular, the design system can be a simulation system and/or a control system. Typically, data and/or information can already be present at the structural level (mechanics), technical control level (parameters) and software level (controller parameters), for example in a CAD, ERP, SPS and/or SAP system and/or system documentation.

Additionally or alternatively, the method can comprise an, in particular subsequent and/or dynamic and/or automatic, comparison of the multiple machine components of the machine. This is because after an, in particular one-off, design of the machine, in particular by means of the design system, the machine may have been subsequently modified or changed, in particular an additional and/or an alternative machine component or machine components may have been used. The comparison can be carried out, for example, by means of ePlan. Additionally or alternatively, the comparison can also be carried out on the basis of the machine operator data, in particular current measurement data such as live data of the SPS system. For example, by linking or connecting various machine components it is possible to obtain a new natural frequency of a machine section. Additionally or alternatively, the machine can be interrogated for installed and/or replaced machine components and the machine operator data can comprise a result of the interrogation.

In one development of the invention, the multiple machine components have at least one mechanical and/or electrical machine component. In particular, the machine component can have a machine frame, a machine cladding, an actuator, an electric motor, a converter, a connecting terminal, a controller, a sensor and/or a capacitor.

In one development of the invention, the component manufacturer data is, in particular digital, information of a component manufacturer about, in particular at least, one of the multiple machine components, in particular a component manufacturer name, a type designation, a material number, a serial number, an article number, an order number, a firmware number, a firmware designation, a firmware status, a software version status, an availability level, a delivery time, a service life, a maintenance interval/maintenance intervals, a property, a connection diagram, an electrical characteristic value, an absolute minimum limiting value or maximum limiting value, a supply voltage, a power consumption level, an input current, a storage temperature, soldering temperature and/or operating temperature, a recommended operating condition, DC data, AC data, an input/output signal shape, a mechanical dimension, a contact arrangement, an environmental approval, a material and/or a recommendation for use. In other words, the component manufacturer data can be information about, in particular at least, one of the multiple machine components from the point of view of the component manufacturer, or this information can be present at the premises of the component manufacturer. The component manufacturer data can be from documentation, data sheets, operating instructions, certificates, manuals and/or maintenance check lists of the component manufacturer.

In one development of the invention, the machine manufacturer data is, in particular digital, information of a machine manufacturer about, in particular at least, one of the multiple machine components, in particular an interaction of one of the multiple machine components with at least one other of the multiple machine components, in particular an arrangement or an installation position and/or a connection. Additionally or alternatively, the machine manufacturer data can be an, in particular interrogated, software version and/or firmware version, in particular in order to be able to compare the latter, in particular with the component manufacturer data. In other words, the machine manufacturer data can be information about, in particular at least, one of the multiple machine components from the point of view of the machine manufacturer, or this information can be present at the premises of the machine manufacturer. The machine manufacturer data can be from documentation, data sheets, operating instructions, certificates, manuals and/or maintenance check lists of the machine manufacturer. The machine manufacturer data can have or comprise, from the point of view of the machine manufacturer, a possible interaction between machine components and/or of one of the multiple machine components in a, in particular mechanical and/or electrical, connection with one other of the multiple machine components. In particular, the machine components which interact with one another and/or are connected to one another, should be matched to one another. The information about the interaction can typically be present at the premises of the machine manufacturer, and the information about the machine component for carrying out the matching can typically be present at the premises of the component manufacturer.

In one development of the invention, the machine operator data can be, in particular digital, information of a machine operator about, in particular at least, one of the multiple machine components, in particular a use, an operating condition, an operating time, a power level, a load, a temperature, an ambient condition, an air humidity level and/or a contamination level. Additionally or alternatively, the machine operating data can be an, in particular interrogated, software version and/or firmware version, in particular in order to be able to compare the latter, in particular with the component manufacturer data. Additionally or alternatively, the machine can be interrogated about installed and/or replaced machine components, and the machine operator data can have a result of the interrogation. In other words, the machine operator data can be information about, in particular at least, one of the multiple machine components from the point of view of the machine operator, or this information can be present at the premises of the machine operator. The machine operator data can be from documentation, data sheets, operating instructions, certificates, manuals and/or maintenance check lists of the machine operator. The machine operator may have possibly coupled the respective machine to another machine/other machines. Additionally or alternatively, the machine can have at least one machine sensor, wherein the machine sensor may be arranged at one of the multiple machine components for the, in particular automatic, determination or detection of machine operator data, in particular of a wide variety of measurement information. This measurement information can permit conclusions to be drawn about the one of the multiple machine components or a group or groups of machine components. This machine operator data, such as operating times in combination with operating condition, in particular linked to the component manufacturer data and/or the machine manufacturer data, permits the status such as a degree of wear, to be determined and therefore detected. A sensor actuator list can be integrated, in particular into the digital machine model and/or the data/information.

Additionally or alternatively, the determined status can be compared with a real or actual status of the machine component. The component manufacturer data, in particular the service life and/or the maintenance interval or intervals, the machine manufacturer data and/or the machine operator data can be adapted, in particular shortened or lengthened, on the basis of a result of the comparison. This can permit the status to be determined more precisely or closer to real conditions the next time.

In one development of the invention the method has the step of: making available, in particular automatically making available, the component manufacturer data, the machine manufacturer data, the machine operator data and/or the status in an, in particular central, database, in particular a digital database. This permits an, in particular central availability. In particular, access by all the involved parties, in particular the component manufacturer or manufacturers, the machine manufacturer or manufacturers and the machine operator or operators, can be made possible to all, in particular to the component manufacturer data, the machine manufacturer data, the machine operator data and the status, or limited, in particular associated, access can be provided. The database can be installed on a central computing and/or storage unit. In particular, the database on the multiple central computing and/or storage units can be installed, in particular for the purpose of providing backup. This can make rapid availability possible. Additionally or alternatively, the database can be located in a cloud.

Additionally or alternatively, the method can comprise the step of: making available, in particular automatically making available, the component manufacturer data, the machine manufacturer data, the machine operator data and/ or the status, in particular, at least, one decentralized or local system such as, for example, a PC, a smartphone and/or a tablet, in particular by means of an app. Furthermore, the method can comprise the step of: synchronizing the decentralized system or systems with the, in particular central, database as soon as the decentralized system or systems has/have a data connection to the database, or if the decentralized system or systems is/are online again or if the machine operator desires or triggers synchronization.

In one development of the invention, the method has the step of: determining, in particular automatically determining, information about, in particular at least, one of the multiple machine components on the basis of the determined status, in particular maintenance information, ordering information and/or information about an alternative machine component. This permits actions for the machine or the one of the multiple machine components to be carried out. In particular, the information can be referred to as diagnostic information. Additionally or alternatively, the maintenance information can have or be information from a maintenance checklist. This can permit better servicing of the machine or of the one of the multiple machine components. In the case of wear, a residual service life of the machine component can be determined, or acquired and/or a replacement machine component, in particular if the latter has relatively poor availability and/or relatively long delivery time, in particular to a remote location, can be ordered and kept in stock. If the replacement machine component has relatively good availability and/or a relatively short delivery time, in particular to a nearby location, the replacement machine component may not or does not need to be ordered or kept in stock, in particular at the premises of the machine operator. Additionally or alternatively, an overview over installed machine components, in particular identical components, can permit a corresponding number of replacement machine components to be selectively kept in stock at at least one location, in particular at the premises of the component manufacturer, at those of the machine manufacturer and/or at those of the machine operator. This can permit rapid repair and/or maintenance. Additionally or alternatively, an alternative machine component which has relatively better availability and/or a relatively shorter delivery time and/or relatively less wear can be ordered and kept in stock or even taken into account in the design of the machine from the outset. The method can have the step of: making available, in particular automatically making available, the determined information in the database. Additionally or alternatively, the information and/or the location of the machine, can be output, in particular optically, in particular displayed, in particular by means of a screen. As a further addition or alternative, the information can be target-group-specific, in particular target-group-compatible. This can permit target-group-defined troubleshooting or fault localization and/or fault recovery or fault elimination. In particular, the information can be different for a machine operator and maintenance personnel, in particular a servicing technician. In particular, the information can be limited to a target group, in particular the machine operator, in particular limited in respect of engagement, and/or unlimited for another target group, in particular the service technicians, in particular without limitation with respect to engagement. As a further addition or alternative, a service order can be sent, in particular automatically, in particular, for repair or maintenance, a requirement for replacement or an order, a field service and/or remote support. As a further addition or alternative, live images can be transmitted, in particular from one location of the machine component, to an internal maintenance or servicing facility and/or a service area, in particular of the component manufacturer, of the machine manufacturer and/or of the machine operator, in particular by means of a live video chat, in particular for information.

Furthermore, the invention relates to a status-determining system for determining the status of the one of multiple machine components of the machine, on the basis of the digital machine model, wherein the digital machine model describes the multiple machine components. The status-determining system according to the invention comprises an, in particular electrical, component manufacturer-determining device, an, in particular electrical, machine manufacturer-determining device, an, in particular electrical, machine operator-determining device and an, in particular electrical, status-determining device. The component manufacturer-determining device is designed to determine component manufacturer data of the multiple machine components. The machine manufacturer-determining device is designed to determine machine manufacturer data of the multiple machine components. The machine operator-determining device is designed to determine machine operator data of the multiple machine components. The status-determining device is designed to determine the status of the one of the multiple machine components by linking the determined component manufacturer data, the determined machine manufacturer data and the determined machine operator data.

The status-determining system can allow the same advantages as the method described above. In particular, the status-determining system can be designed to carry out, in particular automatically, parts for the method described above or even the entire method.

In one development of the invention, the status-determining system comprises at least one machine sensor. The machine sensor is designed for arrangement on one of the multiple machine components in order to determine, in particular automatically, or acquire machine operator data. In particular, the machine sensor can be partially or even entirely embodied as described above with respect to the method.

Further advantages and aspects of the invention can be found in the claims and in the following description of preferred exemplary embodiments of the invention which are explained below with reference to the FIG.

BRIEF DESCRIPTION OF THE DRAWING

FIG. 1 shows a method according to the invention and a status-determining system according to the invention.

DETAILED DESCRIPTION OF THE EXEMPLARY EMBODIMENTS

FIG. 1 shows a method for determining a status ZS of one of multiple machine components MK of a machine MA on the basis of a digital machine model MM, wherein the digital machine model MM describes the multiple machine components MK. The method has the steps of: determining component manufacturer data KHD of the multiple machine components MK; determining machine manufacturer data MHD of the multiple machine components MK; determining machine operator data MBD of the multiple machine components MK; and determining the status ZS of the one of the multiple machine components MK by linking the determined component manufacturer data KHD, the determined machine manufacturer data MHD and the determined machine operator data MBD.

Furthermore, FIG. 1 shows a status-determining system 10 for determining the status ZS of the one of multiple machine components MK of the machine MA on the basis of the digital machine model MM, wherein the digital machine model MM describes the multiple machine components MK. The status-determining system 10 has a component manufacturer-determining device 11, a machine manufacturer-determining device 12, a machine operator-determining device 13 and a status-determining device 14. The component manufacturer-determining device 11 is designed to determine component manufacturer data KHD of the multiple machine components MK. The machine manufacturer-determining device 12 is designed to determine machine manufacturer data MHD of the multiple machine components MK. The machine operator-determining device 13 is designed to determine machine operator data MBD of the multiple machine components MK. The status-determining device 14 is designed to determine the status ZS of the one of the multiple machine components MK by linking the determined component manufacturer data KHD, the determined machine manufacturer data MHD and the determined machine operator data MBD.

In other words, the status-determining system 10 is designed to carry out the method described above.

In the exemplary embodiment shown, the state-determining device 14 is an, in particular, central computing and/or storage unit 14. Provided in the status-determining device 14 for each machine component MK is an associated memory area in which data/information relating to the machine component MK can be stored. In addition, in the exemplary embodiment shown the status-determining system 10 has a further computing and/or storage unit 15 which has the digital machine model MM. In alternative exemplary embodiments, the status-determining device 14 can have the digital machine model MM.

In detail, the digital machine model MM is generated from a design system KS. In the exemplary embodiment shown, a further computing and/or storage unit 16 has the design system KS. The computing and/or storage unit 16 can be part of the status-determining system 10. In alternative exemplary embodiments, the status-determining device 14 can have the design system KS, in particular data of the design system KS.

In detail, the component manufacturer data KHD is information of a component manufacturer KH about one of the multiple machine components MK. In the exemplary embodiment shown, the component manufacturer data KHD are present at the premises of the component manufacturer KH or on a server or an, in particular electrical, storage unit 21 of the component manufacturer KH. The status-determining system 10 or its component manufacturer-determining device 11 is designed to retrieve the component manufacturer data KHD from the component manufacturer KH and to transmit it to the status-determining device 14, in particular for storage in the associated memory area. The component manufacturer-determining device 11 can be referred to as a component manufacturer data retrieval and/or transmission device.

Furthermore, the machine manufacturer data MHD is information of a machine manufacturer MH about one of the multiple machine components MK. In the exemplary embodiment shown, the machine manufacturer data MHD is present at the premises of the machine manufacturer MH or on a server or an, in particular electrical, storage unit 22 of the machine manufacturer MH. The status-determining system 10 or its machine manufacturer-determining device 12 is designed to retrieve the machine manufacturer data MHD from the machine manufacturer MH and to transmit it to the status-determining device 14, in particular for storage in the associated memory area. The machine manufacturer-determining device 11 can be referred to as a machine manufacturer data retrieval and/or transmission device.

Moreover, the machine operator data MBD is information of a machine operator MB about one of the multiple machine components MK. In the exemplary embodiment shown, the machine operator data MBD is present at the premises of the machine operator MB or on a server or an, in particular electrical, storage unit 23 of the machine operator MB. The status-determining system 10 or its machine operator-determining device 13 is designed to retrieve the machine operator data MBD from the machine operator MB and to transmit it to the status-determining device 14, in particular for storage in the associated memory area. The machine operator-determining device 13 can be referred to as a machine operator data retrieval and/or transmission device.

Furthermore, the status-determining system ZS has at least one machine sensor MS. The machine sensor MS is designed for arrangement on one of the multiple machine components MK for determining machine operator data MBD.

In addition, the method comprises the step of: making available the component manufacturer data KHD, the machine manufacturer data MHD, the machine operator data MBD and/or the status ZS in a database DB, like a cloud, as illustrated in FIG. 1.

In addition, the method comprises the step of: determining information Info about one of the multiple machine components MK on the basis of the determined status ZS. In addition, in the exemplary embodiment shown the method has the step of: making available the determined information Info in the database DB.

The method or the status-determining system 10 permits integrated communication, for example between a sales representative, a producer, a service technician, in particular in each case, as an operator and/or machine levels.

In the exemplary embodiment shown, the machine MA has four machine components MK. In alternative exemplary embodiments, the machine can have fewer than four machine components or more than four machine components, in particular at least 10, in particular at least 100, in particular at least 1,000 machine components.

Moreover, in the exemplary embodiment shown, the status-determining system ZS has two machine sensors MS. In alternative exemplary embodiments, the status-determining system can have just a single or individual machine sensor or more than two machine sensors, in particular at least 10, in particular at least 100, in particular at least 1,000 machine sensors.

In detail, the multiple machine components MK have at least one mechanical and/or electrical machine component MEMK.

For example the mechanical machine component MEMK is a connecting bolt which mechanically connects further machine components MK to one another and at the same time is loaded by the further machine components MK, in particular while the machine MA is operating.

The machine sensor MS is designed to determine machine operator data MBD in the form of an operating period of the machine MA.

The status ZS of the connecting bolt MEMK is determined by linking the component manufacturer data KHD, in particular a property of the connecting bolt MEMK such as a permissible number of loads and an availability level and/or a delivery time of the connecting bolt MEMK, the machine manufacturer data MHD, in particular what type of further machine components MK are actually connected to one another mechanically by the connecting bolt MEMK and the machine operator data MBD.

The status describes whether the connecting bolt MEMK is still satisfactory or can still be loaded or not or is worn. Furthermore, the status describes whether the connecting bolt MEMK constitutes a risk with respect to failure of the machine MA or not. Even if the permissible number of loads of the connecting bolt MEMK is not directly reached or imminent, and therefore the connecting bolt MEMK is still satisfactory, a long delivery time of the connecting bolt MEMK has the effect that the connecting bolt MEMK constitutes a risk of failure of the machine MA, and the status ZS of the connecting bolt MEMK is therefore critical. The information Info about the connecting bolt MEMK, here the recommendation to order and keep in stock a replacement connecting bolt, is determined on the basis of the determined status ZS of the connecting bolt MEMK.

The component manufacturer data KHD, the machine manufacturer data MHD, the machine operator data MBD, the status ZS and the information Info can be retrieved from the database DB.

In addition, the status ZS, in particular if the status ZS is critical, and/or the information Info which is based thereon are/is output to the machine operator, the machine manufacturer and/or the component manufacturer, in particular automatically. This can be referred to as an, in particular automated, report function.

As the exemplary embodiments which are shown and explained above make clear, the invention makes available an advantageous method for determining a status of one of multiple machine components of a machine and an advantageous status-determining system which respectively permits improved determination of a status.

What is claimed is:

1. A method for determining a status of one machine component of multiple machine components of a machine based on a digital machine model, the method comprising:
   determining component manufacturer data of the multiple machine components;
   determining machine manufacturer data of the multiple machine components that describes an arrangement and/or connection interaction of the one machine component with another machine component of the multiple machine components;
   determining machine operator data of the multiple machine components that describes:
      a use, an operating condition, an operating time, a power level, a load, a temperature, an ambient condition, an air humidity level, and/or a contamination level;
   determining whether the one machine component constitutes a risk of failure of the machine by linking the determined component manufacturer data, the determined machine manufacturer data, and the determined machine operator data; and
   based on the risk of failure determined by the linking, determining maintenance information and ordering information, wherein
      the digital machine model is generated from a design system, and
      the digital machine model describes the multiple machine components.

2. The method as claimed in claim 1, wherein the multiple machine components have at least one mechanical and/or electrical machine component.

3. The method as claimed in claim 1, wherein the component manufacturer data is information of a component manufacturer about one of the multiple machine components, including one or more of:
   a component manufacturer name, a type designation, a material number, a serial number, an article number, an order number, a firmware number, a firmware designation, a firmware status, a software version status, an availability level, a delivery time, a service life, a maintenance interval/maintenance intervals, a property, a connection diagram, an electrical characteristic value, an absolute minimum limiting value or maximum limiting value, a supply voltage, a power consumption level, an input current, a storage temperature, soldering temperature and/or operating temperature, a recommended operating condition, DC data, AC data, an input/output signal shape, a mechanical dimension, a contact arrangement, an environmental approval, a material and/or a recommendation for use.

4. The method as claimed in claim 1, further comprising the step of:
   making available the component manufacturer data, the machine manufacturer data, the machine operator data and/or the status in a database.

5. A status-determining system for determining a status of one machine component of multiple machine components of a machine based on a digital machine model, the status-determining system comprising:
   a component manufacturer determining device to determine component manufacturer data of the multiple machine components;
   a machine manufacturer determining device to determine machine manufacturer data of the multiple machine components that describes an arrangement and/or connection interaction of the one machine component with another machine component of the multiple machine components;
   a machine operator determining device to determine machine operator data of the multiple machine components that describes:
      a use, an operating condition, an operating time, a power level, a load, a temperature, an ambient condition, an air humidity level, and/or a contamination level; and
   a status determining device to:
      determine whether the one machine component constitutes a risk of failure of the machine by linking the determined component manufacturer data, the determined machine manufacturer data, and the determined machine operator data; and
      based on the risk of failure determined by the linking, determine maintenance information and ordering information, wherein
         the digital machine model is generated from a design system, and
         the digital machine model describes the multiple machine components.

6. The status determining system as claimed in claim 5, further comprising:
   at least one machine sensor for arrangement on one of the multiple machine components to determine the machine operator data.

* * * * *